United States Patent [19]

Brown et al.

[11] Patent Number: 5,220,782
[45] Date of Patent: Jun. 22, 1993

[54] EFFICIENT LOW TEMPERATURE SOLVENT REMOVAL OF ACID GASES

[75] Inventors: Charles R. Brown, Berkeley, Calif.; Robert Geosits, N. Potomac, Md.

[73] Assignee: Bechtel Group, Inc., San Francisco, Calif.

[21] Appl. No.: 780,610

[22] Filed: Oct. 23, 1991

[51] Int. Cl.$^5$ .................... F02B 43/00; F02G 3/00
[52] U.S. Cl. .................... 60/39.02; 60/39.12; 60/39.181; 55/73; 55/268; 48/206
[58] Field of Search .......... 60/39.02, 39.12, 39.181; 55/73, 268; 48/197 R, 202, 203, 206

[56] References Cited

U.S. PATENT DOCUMENTS

| | | | |
|---|---|---|---|
| 4,019,314 | 4/1977 | Springmann | 60/39.02 |
| 4,155,988 | 5/1979 | Karwat et al. | 423/366 |
| 4,211,540 | 7/1980 | Netzer | 48/202 |
| 4,212,160 | 7/1980 | Blaskowski | 60/39.12 |
| 4,524,581 | 6/1985 | Cascone et al. | 60/39.02 |
| 4,597,257 | 7/1986 | Schuster et al. | 60/39.12 |
| 4,631,915 | 12/1986 | Frewer et al. | 60/39.12 |
| 4,651,519 | 3/1987 | Goebel et al. | 60/39.12 |
| 4,697,413 | 10/1987 | Pohl | 60/39.12 |
| 4,957,515 | 9/1990 | Hegarty | 60/39.02 |
| 4,999,992 | 3/1991 | Nurse | 60/39.02 |

FOREIGN PATENT DOCUMENTS

| | | | |
|---|---|---|---|
| 2005721 | 8/1971 | Fed. Rep. of Germany | 60/39.12 |
| 0145322 | 7/1986 | Japan | 60/39.12 |

*Primary Examiner*—Richard A. Bertsch
*Assistant Examiner*—Howard R. Richman
*Attorney, Agent, or Firm*—Townsend and Townsend Khourie and Crew

[57] ABSTRACT

A high pressure synthetic gas stream is produced by gasifying coal. Hydrogen sulfide is removed by contacting the high pressure gas stream with a physical solvent, such as an alcohol, in an absorber column. A low temperature is maintained in the absorber column, typically by chilling both the solvent and the incoming high pressure synthetic gas stream, where a portion of the cooling requirement is supplied by adiabatically expanding the cleaned high pressure gas stream exiting the absorber. Typically, the cleaned high pressure gas stream will be expanded in a turbine expander to provide mechanical energy in addition to cooling capacity. The cleaned synthetic gas is useful as a fuel or chemical feedstock.

19 Claims, 2 Drawing Sheets

EFFICIENT LOW TEMPERATURE SOLVENT REMOVAL OF ACID GASES

BACKGROUND OF THE INVENTION

1. Field of the Invention

The present invention relates generally to methods for low temperature solvent absorption of acid gases from high pressure gas streams. More particularly, the present invention relates to a method for expanding a cleaned synthetic gas stream to provide at least a portion of the cooling requirement for the low temperature solvent absorption.

Synthetic gas streams produced by coal gasification are usually contaminated with sulfur, typically in the form of hydrogen sulfide, carbonyl sulfide, and the like. Before the synthetic gas can be used as a fuel for combustion or as a feed stock for chemical synthesis, it is usually necessary to remove such sulfur species to low levels.

Various processes are used for sulfur removal, including absorption processes which rely on contacting the synthetic gas stream with a physical or chemical solvent under conditions which promote absorption. Of particular interest to the present invention, physical solvents, such as lower monohydric alcohols, e.g. methanol, and polyhydric alcohols, e.g. ethylene glycol, may be contacted with the synthetic gas streams at low temperatures to effect the absorption of hydrogen sulfide. Such low temperature physical solvent absorption processes are commercialized under the tradenames Selexol (DMPEG), Ucarsol, Rectisol (low temperature), Purisol (NMP), and Fluor Solvent (propylene carbonate).

Low temperature solvent absorption of acid gas may be achieved in a conventional contactor, such as a tray or packed column, where the inlet solvent and/or the inlet synthetic gas are chilled and the column is insulated. Chilling of the solvent and/or inlet gas has usually been accomplished by direct or indirect heat exchange with a refrigerant which has been cooled in external refrigeration equipment. Although effective, the need to use external refrigeration equipment requires substantial energy and reduces the overall energy efficiency of the solvent absorption process.

It would therefore be desirable to provide a low temperature solvent acid gas absorption process having improved energy efficiency. In particular, it would be desirable to provide such low temperature acid gas absorption processes having a reduced requirement for external refrigeration. Even more particularly, it would be desirable to arrange the absorption process to employ energy available from the treated gas itself to provide for at least a portion of the necessary refrigeration requirement. Additionally, it would be desirable to arrange the absorption process to allow extraction of mechanical energy from the treated gas, where such mechanical energy can be used for producing electricity or other purposes.

2. Description of the Background Art

U.S. Pat. No. 4,019,314, discloses a coal gasifier which produces a synthetic gas which is fed to a scrubber-cooler. The scrubbed synthetic gas is fed to an expansion turbine, where mechanical energy is extracted. U.S. Pat. No. 4,524,581, describes a high pressure coal gasification process. U.S. Pat. No. 4,212,160 describes acid gas removal processes in combination with coal gasification. U.S. Pat. Nos. 4,211,540 and 4,155,988, describe the use of low temperature physical solvents for absorbing hydrogen sulfide from synthetic gases produced by coal gasification. None of the processes described in these patents disclose the expansion of gas with gas treating to reduce refrigeration requirements and increase efficiency.

SUMMARY OF THE INVENTION

According to the present invention, hydrogen sulfide is removed from a high pressure gas stream, such as a synthetic gas stream or a refinery gas stream, by contacting the high pressure gas with a solvent, typically a physical solvent, in a low temperature environment. The resulting high pressure clean gas is then expanded, usually in a turbine expander or across a refrigeration valve, to produce a cooled gas stream. The cooled gas stream can be used to extract heat from the low temperature environment, thus providing at least a portion of the refrigeration load for the process. Use of the turbine expander will further provide useful mechanical energy. In this way, the overall process efficiency is increased.

The present invention further provides a method for gasifying sulfur-containing fuels, such as oil, coal, heavy oil emulsion, or other hydrocarbon feedstock. The fuel is combined with oxygen and gasified to produce a high pressure synthetic gas stream containing hydrogen sulfide. The high pressure synthetic gas stream is then contacted with a physical solvent in a low temperature environment, generally as described above. Optionally, carbonyl sulfide may be hydrolyzed to hydrogen sulfide before contacting the synthetic gas stream with the solvent. Optionally, the synthesis gas may be treated in the same or a second treatment unit to remove other components, such as carbon dioxide, trace element, or hydrocarbons. The resulting clean synthetic gas is then expanded, either through a turbine expander or across the refrigeration valve, to produce a cooled synthetic gas stream and optionally mechanical energy. The refrigerated synthetic gas stream is used to extract heat from the low temperature environment of the absorber, usually by heat exchange with either the incoming hot synthetic gas stream or the solvent stream, or both. The cooled synthetic gas is available as either a fuel or a chemical feedstock.

DESCRIPTION OF THE PREFERRED EMBODIMENT

The present invention comprises a process for removing acid gas, particularly hydrogen sulfide ($H_2S$), from a high pressure gas stream. The high pressure gas stream will typically have a pressure above about 200 psia (pounds per square inch absolute), usually above 400 psia, frequently from about 600 psia to 1,000 psia, and more frequently from about 650 psia to 950 psia. The temperature of the high pressure gas stream is not critical, but will typically be above ambient, frequently being above 100° F., often being above 200° F., and sometimes being above 500° F., or higher. It should be noted that while a high gas pressure is necessary for the method of the present invention, a high gas temperature is not necessary. In many cases, the process of the present invention will provide for cooling of the gas stream (typically using air and/or water cooling) before it enters a low temperature acid gas absorption region, as described hereinafter.

While the high pressure gas stream of the present invention can originate from a variety of sources, including both natural and synthetic sources, the gas will usually be a synthetic gas stream produced by coal gasification (as described in more detail hereinbelow) or a refinery gas stream produced by hydrocarbon processing. In all cases, the high pressure gas stream will have a relatively high hydrogen sulfide content, typically being above about 0.01 mole percent, frequently being above about 0.5 mole percent, and sometimes being above 1.0 mole percent. It is an object of the present invention to reduce the hydrogen sulfide content of the high pressure gas stream to provide a clean gas stream for subsequent processing or combustion. The clean gas stream will have a hydrogen sulfide content below about 0.01 mole percent, preferably being below about 0.005 mole percent, and more preferably being below about 0.001 mole percent.

Figure 1:
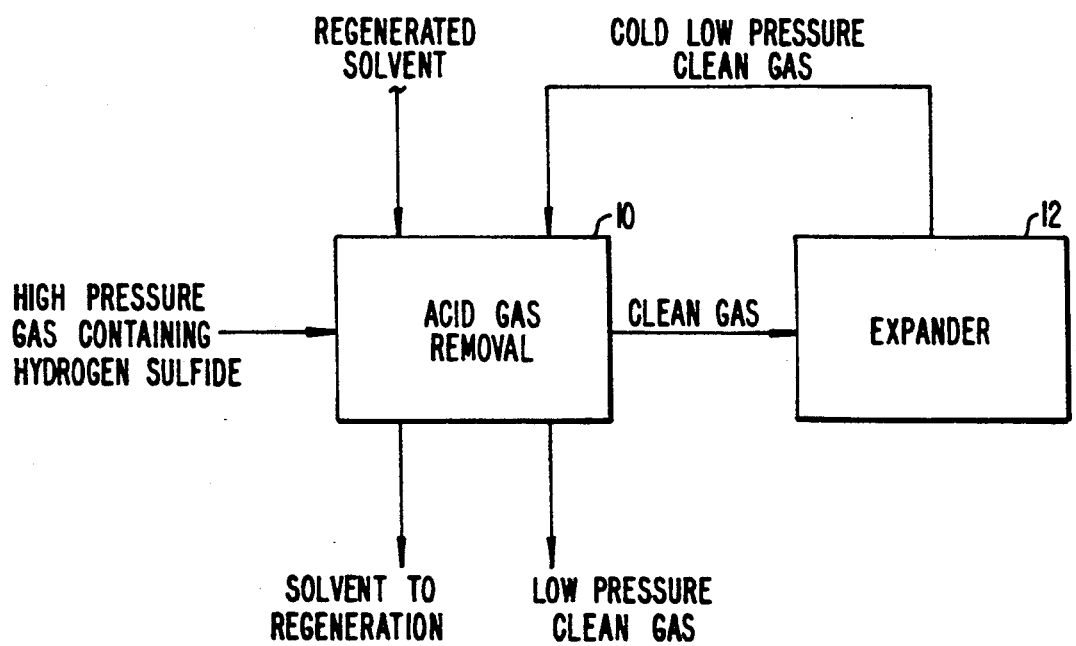
FIG. 1 is a block diagram illustrating the process of the present invention for the removal of acid gas from high pressure gas streams.

Referring now to FIG. 1, the method of the present invention comprises treating a high pressure gas stream with a low temperature solvent in an acid gas removal zone 10 to physically absorb the hydrogen sulfide. The low temperature solvent can be any physical absorbent which is advantageously used at low temperatures to physically absorb hydrogen sulfide by conventional absorption processes. Typically, the low temperature solvent will be an alcohol, such as a monohydric alcohol, e.g. methanol, or a polyhydric alcohol, e.g. ethylene glycol, or the like. Temperature in the acid gas removal zone 10 will typically be maintained below about 40° F., usually being maintained below about 30° F., preferably being maintained in the range between about −100° F. and 20° F., and more preferably being maintained in the range between −80° F. and 0° F., in order to efficiently absorb hydrogen sulfide. The particular temperature chosen will depend on the nature of the solvent being utilized.

The solvent and the high pressure gas stream are fed to the acid gas removal zone 10, typically in absorption column such as a tray column or packed column, where direct contact occurs and the hydrogen sulfide is preferentially absorbed by the solvent. Usually, the absorption column is insulated and cooling of the column is provided by chilling the incoming solvent and/or the incoming high pressure gas. As described below, at least a portion of the total cooling requirement of the acid gas removal zone 10 is met by heat exchange with a cold low pressure clean gas stream provided by an adiabatic expansion of the clean gas stream which flows from the acid gas removal zone.

Solvent from the acid gas removal zone 10 will usually be recovered and regenerated, typically in separate regeneration columns (not illustrated) so that the solvent can be reused. In some cases, the cooling requirements of overhead condensers on some or all of the absorption and regeneration columns can be met by heat exchange with the cold low pressure clean gas. In some cases, the acid gas removal zone 10 produces a low pressure clean gas which leaves the acid gas removal zone 10 (i.e. after heat exchange to provide a portion of the cooling load) can be used for any desired purpose, such as for combustion or as a feedstock in the case of synthetic gases produced from coal gasification or for further processing in the case of refinery gases.

The high pressure clean gas stream which leaves the acid gas removal zone 10 passes to an expander 12, where the gas is adiabatically expanded, either across a conventional refrigeration (expansion) valve or through an expansion turbine. In the latter case, mechanical energy can be extracted as the gas expands, frequently for use in producing electricity. The temperature of the gas leaving the acid gas removal zone 10 and entering the expander 12 will usually be substantially reduced compared to the gas which enters the acid gas removal zone, typically having a temperature at or below ambient. The gas stream leaving the expander 12 will be significantly cooled, typically having a temperature below about 0° F., frequently being below about −40° F. The pressure will also be reduced relative to the inlet pressure, frequently being reduced to an absolute pressure at or below about 400 psia, frequently at or below about 300 psia. Thus, the pressure reduction will usually range from about 250 psi to 1200 psi. The cold low pressure clean gas, as described above, is used to supply a portion of the cooling load which is necessary to maintain a low temperature in the acid gas removal zone 10. Typically, the cold low pressure gas is indirectly contacted with either the solvent or the high pressure gas, usually the high pressure gas, in a conventional heat exchanger.

Figure 2:
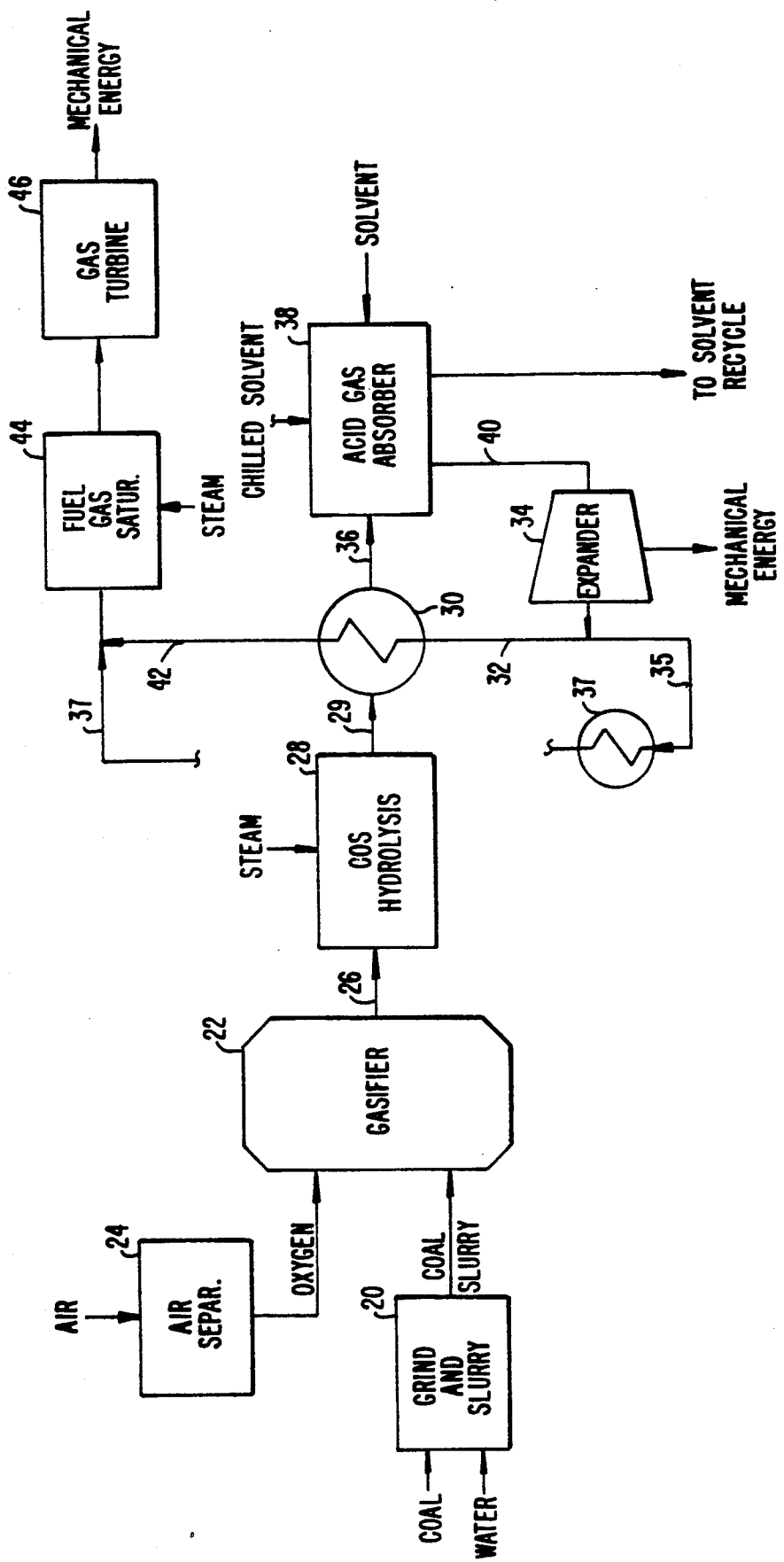
FIG. 2 is an overall block diagram illustrating the coal gasification method of the present invention employing acid gas removal and heat exchange between the cooled and hot synthetic gas streams produced.

Referring now to FIG. 2, a method for coal gasification according to the present invention will be described. Coal is ground and slurried in conventional equipment 20, and the resulting coal slurry introduced to a high pressure wet gasifier 22. The coal slurry is combined with an oxygen stream (typically produced in a conventional air separator 24) inside the gasifier 22 under conditions selected to produce a synthetic gas stream 26. Typically, pressure inside the gasifier 22 will be in the range from about 400 psia to 1500 psia, usually being in the range from about 700 psia to 900 psia, and the temperature will be maintained in the range from about 2200° F. to 2700° F., usually from about 2400° F. to 2600° F. Conventional coal gasification processes useful for the methods of the present invention include but are not limited to the Texaco process, the Shell process, the Dow (Destec) process, the HTW process (Lurgi) and the BGL process and can use air or oxygen as the oxidation medium. These processes are referenced in Electrical Power Research Institute Report, AP3109, Palo Alto, Calif.

This synthetic gas stream produced by coal gasification at the wet gasifier 22 or a dry gasifier (not illustrated) will have a low to medium heat (BTU) content and will be suitable for use as a fuel, feedstock, or other process intermediate, after acid gas removal according to the/present invention. In some cases, however, it is desired that the synthetic gas have an increased hydrogen content either as a feedstock or as a fuel, which may be provided by routing the synthetic gas stream through a shift register 27 where carbon monoxide (CO) is converted to hydrogen and carbon dioxide by reaction with steam. The carbon dioxide can be removed in a subsequent carbon dioxide absorber 31. However, as the present invention relies on a differential pressure between processes upstream and downstream of the acid gas removal facilities, the ultimate downstream pressure will determine the feasibility of adding steps to the basic process. If a carbon dioxide removal step is employed, cooling may be supplied if necessary by routing the carbon dioxide removal solvent through heat exchanger 37 as depicted in FIG. 2.

The synthetic gas stream 26 leaving gasifier 22 will typically have particulates removed (not illustrated) as well as having carbonyl sulfide (COS) removed in a COS hydrolysis unit 28. Carbonyl sulfide is not readily removed by most low temperature physical solvents (as used later in the process of the present invention). Reaction of the synthetic gas stream 26 with steam will convert the carbonyl sulfide to hydrogen sulfide and carbon dioxide. The hydrogen sulfide is readily removed in the acid gas absorber of the present invention, while the carbon dioxide may be removed in a similar carbon dioxide absorber if employed.

After cross exchange and raw gas cooling, synthetic gas stream 29 from COS hydrolysis vessel 28 enters a heat exchanger 30 where it is cooled by exchange with expanded gas stream 32 from expander 34, as described in more detail hereinafter. Typically, the synthetic gas stream 29 into the heat exchanger 30 will have a temperature in the range from about 100° F. to 250° F., usually about 100° F. to 120° F., while synthetic gas stream 36 exiting exchanger 30 will have a temperature in the range from about −100° F. to 40° F., usually from about 0° F. to 20° F. The pressure of the stream 36 will typically be in the range from about 1500 psia to 550 psia.

Synthetic gas stream 36 enters acid gas absorber 38, which is typically a tray or packed column where the gas stream runs countercurrent with a chilled solvent. The chilled solvent will be cooled by external refrigeration in a conventional manner. In alternative embodiments, of course, a cooled synthetic gas stream 35 from expander 34 might be used to supply a portion of the cooling requirement for the solvent in exchanger 37. Additionally, the chilled synthetic gas stream 32 may also be utilized to supply a portion of the cooling requirement for a solvent presaturator upstream of the absorber column of the acid gas absorber unit 38.

A cleaned synthetic gas stream 40 exits the acid gas absorber 38 and enters a turbine expander 34 which provides mechanical energy. Conveniently, the turbine expander 34 may employ an electrical generator brake which directly supplies current for use elsewhere in the gasification plant or for distribution to a power grid. The expanded synthetic gas stream 32 leaves expander 34, typically at a temperature in the range from about −100° F. to 40° F., usually from about 0° F. The expanded gas stream 32 passes through heat exchanger 30 and exits in the stream 42, where it is suitable for further use or combustion. For combustion, it is convenient to saturate the synthetic gas with steam at fuel gas saturator 44 and combust the saturated fuel gas in a gas turbine 46. The construction and use of both the fuel gas saturator 44 and the gas turbine 46 are conventional and well known in the art.

Although the foregoing invention has been described in detail for purposes of clarity of understanding, it will be obvious that certain modifications may be practiced within the scope of the appended claims.

What is claimed is:

1. A method for gasifying coal, said method comprising:
    (a) combining ground coal and oxygen under conditions selected to produce a high pressure synthetic gas stream having a pressure above about 100 psia and containing hydrogen sulfide;
    (b) cooling the high pressure synthetic gas stream;
    (c) cooling a solvent capable of physically absorbing hydrogen sulfide;
    (d) contacting the cooled high pressure synthetic gas stream and the cooled solvent stream to remove hydrogen sulfide and thereby to produce a clean gas stream having a hydrogen sulfide content less than that present in the uncleaned high pressure gas stream;
    (e) expanding the clean synthetic gas stream to produce a cooled synthetic gas stream; and
    (f) providing at least a portion of the cooling requirement of step (b) or step (c) by heat exchange with the cooled synthetic gas stream produced in step (e).

2. A method as in claim 1, wherein an aqueous slurry of the ground coal is combined with the oxygen in a gasification step.

3. A method as in claim 1, wherein dry ground coal is combined with the oxygen in the gasification step.

4. A method as in claim 1, further comprising shifting a portion of the carbon monoxide in the high pressure synthetic gas stream to carbon dioxide and hydrogen by reaction with steam.

5. A method as in claim 1, further comprising hydrolyzing carbonyl sulfide present in the high pressure synthetic gas to hydrogen sulfide prior to contacting said high pressure synthetic gas with the solvent.

6. A method as in claim 1, wherein the high pressure synthetic gas stream produced in step (a) has a pressure in the range from 200 psia to 1500 psia and a temperature in the range from 80° F. to 3000° F.

7. A method as in claim 1, wherein step (b) is performed by indirectly contacting the cooled synthetic gas stream produced in step (e) with the high pressure synthetic gas stream produced in step (a) in a heat exchanger.

8. A method as in claim 1, wherein the solvent is an alcohol.

9. A method as in claim 1, wherein the clean synthetic gas stream is expanded in a turbine to produce mechanical energy.

10. A method as in claim 1, wherein the expanded clean synthetic gas stream is saturated with steam and fed to a gas turbine to produce mechanical energy.

11. A method as in claim 1, wherein the clean synthetic gas stream is expanded across a pressure let down valve to produce a cooled synthetic gas stream.

12. A method as in claim 1, further comprising a carbon dioxide removal step.

13. A method as in claim 1, wherein the cooled synthetic gas is used to refrigerate a carbon dioxide removal solvent.

14. A method for gasifying sulfur-containing fuels, said method comprising:
    combining the fuel with oxygen to produce a high pressure synthetic gas stream having a pressure above about 100 psia and containing hydrogen sulfide;
    contacting the high pressure synthetic gas stream with a solvent in a low temperature environment having a temperature less than about 80° F. to remove hydrogen sulfide and thereby to produce a clean synthetic gas stream having a hydrogen sulfide content less than that present in the uncleaned high pressure gas stream;
    expanding the clean synthetic gas stream to produce a cooled synthetic gas stream; and extracting heat from the low temperature environment by heat exchange with the cooled synthetic gas stream.

15. A method as in claim 14, wherein the fuel is coal.

16. A method as in claim 14, wherein the high pressure synthetic gas stream has a pressure of at least 200 psia.

17. A method as in claim 14, wherein the low temperature environment is maintained at a temperature below 40° F.

18. A method as in claim 17, wherein the temperature is maintained by extracting heat from the incoming high pressure synthetic gas, wherein at least a portion of the heat extraction is provided by heat exchange with the cooled synthetic gas stream.

19. A method as in claim 8, wherein the temperature is maintained by extracting heat from the incoming solvent, wherein at least a portion of the heat extraction is provided by heat exchange with the incoming solvent.

* * * * *